United States Patent
Baldwin et al.

(10) Patent No.: US 9,336,076 B2
(45) Date of Patent: May 10, 2016

(54) SYSTEM AND METHOD FOR CONTROLLING A REDUNDANCY PARITY ENCODING AMOUNT BASED ON DEDUPLICATION INDICATIONS OF ACTIVITY

(71) Applicant: GlobalFoundries U.S. 2 LLC, Hopewell Junction, NY (US)

(72) Inventors: Duane M. Baldwin, Mantorville, MN (US); John T. Olson, Tucson, AZ (US); Sandeep R. Patil, Pune (IN); Riyazahamad M. Shiraguppi, Pune (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 210 days.

(21) Appl. No.: 13/975,075

(22) Filed: Aug. 23, 2013

(65) Prior Publication Data
US 2015/0058582 A1    Feb. 26, 2015

(51) Int. Cl.
*G06F 13/00* (2006.01)
*G06F 13/28* (2006.01)
*G06F 11/10* (2006.01)
*G06F 3/06* (2006.01)

(52) U.S. Cl.
CPC *G06F 11/10* (2013.01); *G06F 3/06* (2013.01); *G06F 3/067* (2013.01); *G06F 3/0608* (2013.01); *G06F 3/0641* (2013.01)

(58) Field of Classification Search
CPC .......................... G06F 17/30156; G06F 3/0641
See application file for complete search history.

(56) References Cited

U.S. PATENT DOCUMENTS

| | | | |
|---|---|---|---|
| 7,567,188 B1 | 7/2009 | Anglin et al. | |
| 7,827,137 B2 | 11/2010 | Patterson | |
| 7,962,706 B2 | 6/2011 | Davis | |
| 7,992,037 B2 | 8/2011 | Dubnicki et al. | |
| 8,051,362 B2 | 11/2011 | Li et al. | |
| 8,108,638 B2 | 1/2012 | Kishi | |
| 2009/0132619 A1* | 5/2009 | Arakawa et al. | 707/205 |
| 2009/0235022 A1 | 9/2009 | Bates et al. | |
| 2009/0271402 A1 | 10/2009 | Srinivasan et al. | |
| 2011/0185149 A1 | 7/2011 | Gruhl et al. | |
| 2012/0158672 A1 | 6/2012 | Oltean et al. | |
| 2012/0159098 A1 | 6/2012 | Cheung et al. | |
| 2014/0115260 A1* | 4/2014 | Maybee et al. | 711/136 |

OTHER PUBLICATIONS

Li et al., "Reliability Analysis of Deduplicated and Erasure-Coded Storage," HP Laboratories, HPL-2010-146, Published in HotMetrics 2010, Jun. 18, 2010, pp. 1-6.

(Continued)

*Primary Examiner* — Eric S Cardwell
(74) *Attorney, Agent, or Firm* — Gibb & Riley, LLC; Michael J. LeStrange, Esq.

(57) ABSTRACT

According to one embodiment, a method includes determining, using a processor, which physical blocks are priority physical blocks based on at least one of: a number of application blocks referencing the physical block, and a number of accesses to the physical block, creating a reference to each priority physical block, and outputting the reference. According to another embodiment, a method includes receiving a reference to one or more priority physical blocks in a storage pool, and adjusting an amount of redundancy parity encoding for each of the one or more priority physical blocks based on the reference.

18 Claims, 11 Drawing Sheets

(56) References Cited

OTHER PUBLICATIONS

Deshpande, Amey S., "Online Erasure Coding in Distributed Storage Systems," Thesis, North Carolina State University, 2010, pp. 1-50.
Bowers, Kevin D. et al., "How to Tell if Your Cloud Files Are Vulnerable to Drive Crashes," Proc. of the 18th ACM Conference on Computer Communications Security, CCS'1 1, Oct. 17-21, 2011, Chicago, IL, ACM, 2011, pp. 501-514.
Venkatesan, V et al., "Effect of Codeword Placement on the Reliability of Erasure Coded Data Storage Systems," Research Report, IBM Research—Zurich, RZ 3827 (#ZUR1208-013), Aug. 29, 2012, 27 pages.
"Data deduplication," Wikipedia, Apr. 4, 2013, pp. 1-7.

* cited by examiner

| Physical Block ID | Status | Hash value | Logical Blocks Referencing Physical Block ("Logical Block Reference Pointers")_OLD | # of Logical Block Reference Pointers_OLD | # of Accesses ("Read Count")_OLD | # of Accesses ("Read Count")_NEW |
|---|---|---|---|---|---|---|
| 0 | Allocated | 1123da12e3 | LBlock0 LBlock6 LBlock10 | 3 | 50 | 100 |
| 10 | Allocated | 345b5683etac | LBlock1 LBlock3 | 2 | 100 | 120 |
| 20 | Allocated | 678456ecfba | LBlock2 | 1 | 100 | 40 |
| 30 | Freed | ... | ... | ... | ... | ... |
| 40 | Allocated | 37891654abc | LBlock4 LBlock5 | 2 | 150 | 150 |
| 50 | Freed | ... | ... | ... | ... | ... |

SYSTEM AND METHOD FOR CONTROLLING A REDUNDANCY PARITY ENCODING AMOUNT BASED ON DEDUPLICATION INDICATIONS OF ACTIVITY

BACKGROUND

The present invention relates to data storage, and more specifically, this invention relates to systems for dynamically tuning an amount of redundancy parity encoding based on one or more deduplication indications of activity.

Data deduplication is a storage concept involving the elimination or reduction of redundant/duplicate data stored or communicated in a data storage system (e.g. multi disk arrays, redundant arrays of independent disks (RAIDs), etc.). Accordingly, data deduplication facilitates a reduction in storage requirements as only unique data is stored.

Data deduplication may be performed on in-band traffic, e.g. in real time as data is being communicated and/or written to a storage device, and is referred to as inline deduplication. Data deduplication may also occur in post-processing, which occurs after data is transferred to and/or stored upon a storage device. While post-processing data deduplication may shorten the time for data transfer, it requires a full backup to be stored temporarily, thus defeating the storage benefits of deduplication.

Additionally, data deduplication may be performed at the file or at the block (e.g. sub-file) level, thereby defining the minimal data fragment that is checked for redundancy. File level deduplication typically eliminates identical files within or across systems. Conversely, block deduplication looks within a file and saves unique iterations of each block or bit. For instance, with block level deduplication, a file may be split into blocks before being written to and/or stored upon a storage device, and each individual block associated with the file that is found to be a duplicate (e.g. redundant) may be deduplicated.

As mentioned above, in conventional deduplication techniques, an incoming data segment may be divided into sub-units of a desired granularity, e.g. blocks, files, etc. A hash value for each defined sub-unit may then be calculated, where each hash value uniquely identifies the data content of its respective sub-unit. The calculated hash values may then be compared to hash values for existing sub-units already stored in the data storage system, e.g. stored in a storage pool comprising one or more storage devices. For each sub-units having duplicate thereof (e.g. a file or block whose calculated hash value matches a hash value for a stored file or block, respectively), the data storage system may store and/or communicate a reference to the stored sub-unit instead of communicating and/or storing the duplicate sub-unit. Non-duplicate sub-units, e.g. sub-units whose calculated hash values do not match any hash values for the stored sub-units, may be communicated and/or stored to one or more storage devices in the data storage system.

However, deduplication techniques may alter the reliability of data segments. For example, the reliability of a given data segment is based on the reliability of its constituent sub-units, e.g. files, blocks, etc., which may be divided across a plurality of storage devices. Accordingly, data storage systems may implement certain recovery schemes to ensure efficiency (e.g. with regard to the amount of any extra data generated) and reliability (e.g. the extent to which the recovery scheme can recover and/or access lost or compromised data).

Replication is one such recovery scheme, where data is replicated two, three, or more times to different storage devices in the data storage system. A disadvantage with the replication technique is the cost of storing replicate data. Large storage costs may translate to high costs in hardware, as well as high costs in operating the storage system, e.g. cooling, maintenance, etc. Moreover, preserving reliability with known replication schemes may not be effective. For instance, suppose an application block is divided into 4 original blocks (A1, A2, A3, A4) that will be placed on 4 disks. After one replication, 4 replicate blocks ($A1_{copy}$, $A2_{copy}$, $A3_{copy}$, $A4_{copy}$) will be placed on 4 additional disks. If the disk storing an original block, e.g. A1, and a disk storing its replicate, e.g., $A1_{copy}$, both failed, the data associated with the entire application block would be lost, in other words, this exemplary replication scheme may not be able to sustain more than one disk failure.

Another recovery scheme utilizes redundancy parity encoding, which involves the creation/implementation of erasure codes. Redundancy parity encoding typically involves encoding an original data segment in such a way as to generate and embed data redundancies within the data segment. If the data segment is compromised or lost, e.g. from a disk failure, these redundancies would allow recovery of the data or portions thereof. For example, consider a data segment that is divided into m original data blocks. An erasure code, a forward error correction code (FEC) for a binary erase channel, encodes these m original data blocks into n total blocks, where n>m. Thus, the data segment includes the m original data blocks and n−m in parity blocks. The erasure code encoding rate (ER) is given by ER=m/n<1. The key property of erasure codes is that all original data can be recovered when there is no more than n−m failures. Stated another way, if any of the n blocks is corrupted, m is the number of verified blocks required to reconstruct/recover the original data. Accordingly, erasure codes provide redundancy without the overhead of strict replication.

BRIEF SUMMARY

According to one embodiment, a method includes determining, using a processor, which physical blocks are priority physical blocks based on at least one of: a number of application blocks referencing the physical block, and a number of accesses to the physical block. The method also includes creating a reference to each priority physical block, and outputting the reference.

According to another embodiment, a method includes receiving a reference to one or more priority physical blocks in a storage pool, and adjusting an amount of redundancy parity encoding for each of the one or more priority physical blocks based on the reference.

According to yet another embodiment, a system includes one or more computer readable storage media, and at least one processor and logic integrated with and/or executable by the at least one processor, where the logic is configured to: receive a reference to one or more priority physical blocks in a storage pool, and adjust an amount of redundancy parity encoding for each of the one or more priority physical blocks based on the reference. The one or more priority physical blocks are physical blocks based on at least one of: a number of application blocks referencing the physical block, and a number of accesses to the physical block.

Other aspects and embodiments of the present invention will become apparent from the following detailed descrip-

DETAILED DESCRIPTION

Figure 1:
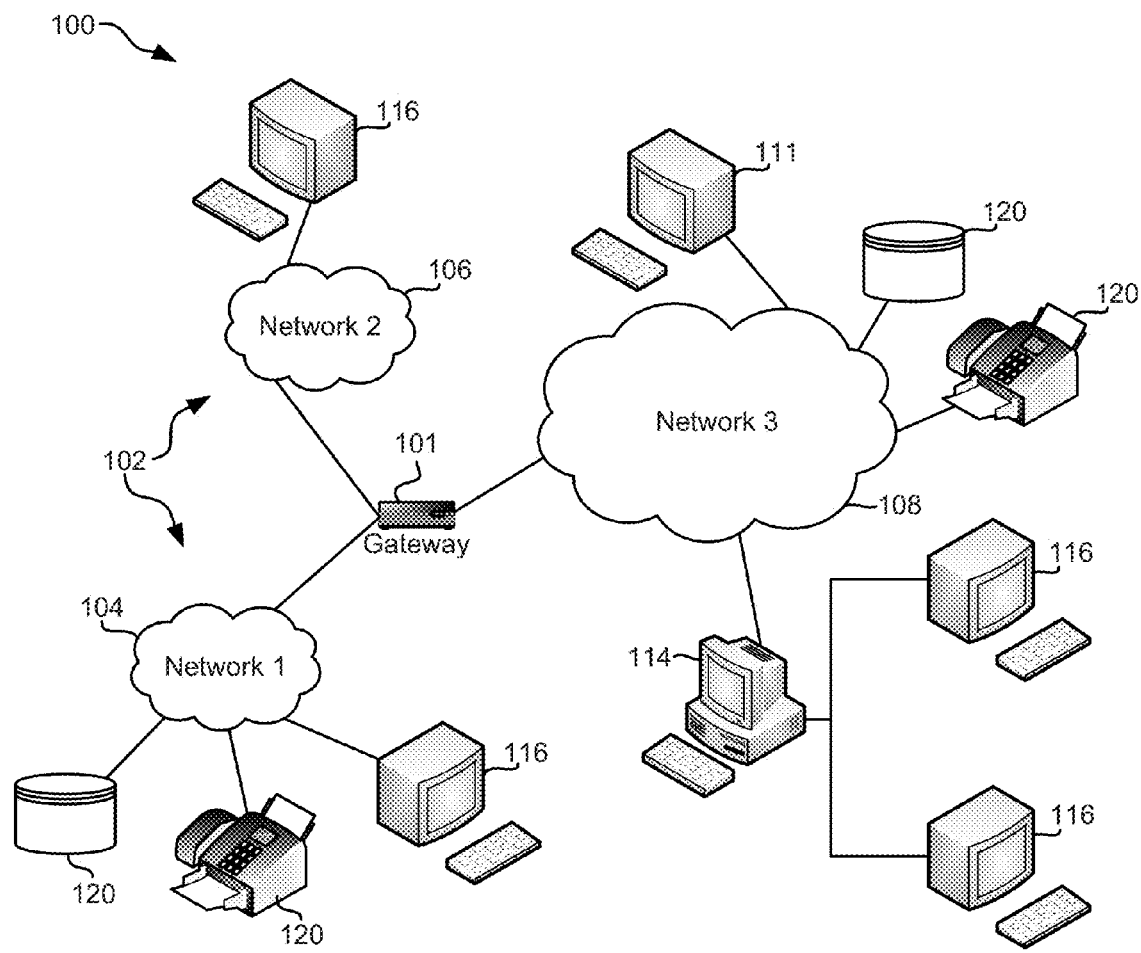
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, an application block may refer to a data segment that is received by any suitable component of the operating environment. For instance, in some approaches an application may send a data segment, i.e. an application block, to a suitable component in a data storage system. Thus, in some approaches the application block may be sent to (and received by) a deduplication layer, a storage pool, etc. or other suitable component of a data storage system as would be understood by one having skill in the art upon reading the present disclosure.

The following description discloses several preferred embodiments of systems, methods and computer program products for dynamically tuning an amount of redundancy parity encoding "erasure code") based on one or more deduplication indications of activity.

In one general embodiment, a method includes determining, using a processor, which physical blocks are priority physical blocks based on at least one of a number of application blocks referencing the physical block, and a number of accesses to the physical block; creating a reference to each priority physical block; and outputting the reference.

In another general embodiment, a method includes receiving a reference to one or more priority physical blocks in a storage pool, and adjusting an amount of redundancy parity encoding for each of the one or more priority physical blocks based on the reference.

In yet another general embodiment, a system includes one or more computer readable storage media, and at least one processor and logic integrated with and/or executable by the at least one processor, where the logic is configured to: receive a reference to one or more priority physical blocks in a storage pool, and adjust an amount of redundancy parity encoding for each of the one or more priority physical blocks based on the reference, where the one or more priority physical blocks are physical blocks based on at least one of: a number of application blocks referencing the physical block, and a number of accesses to the physical block.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." For example, one approach may include a processor and logic integrated with and/or executable by the processor, the logic being configured to perform various operations. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified application function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided eluding a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the e works 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
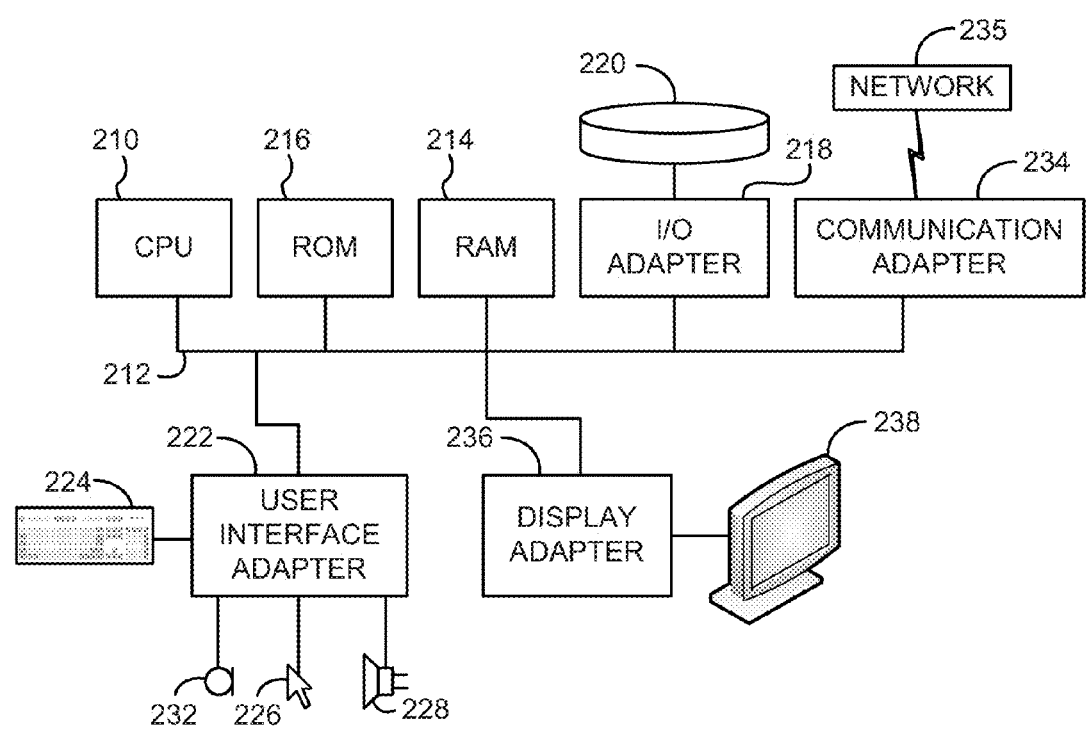
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
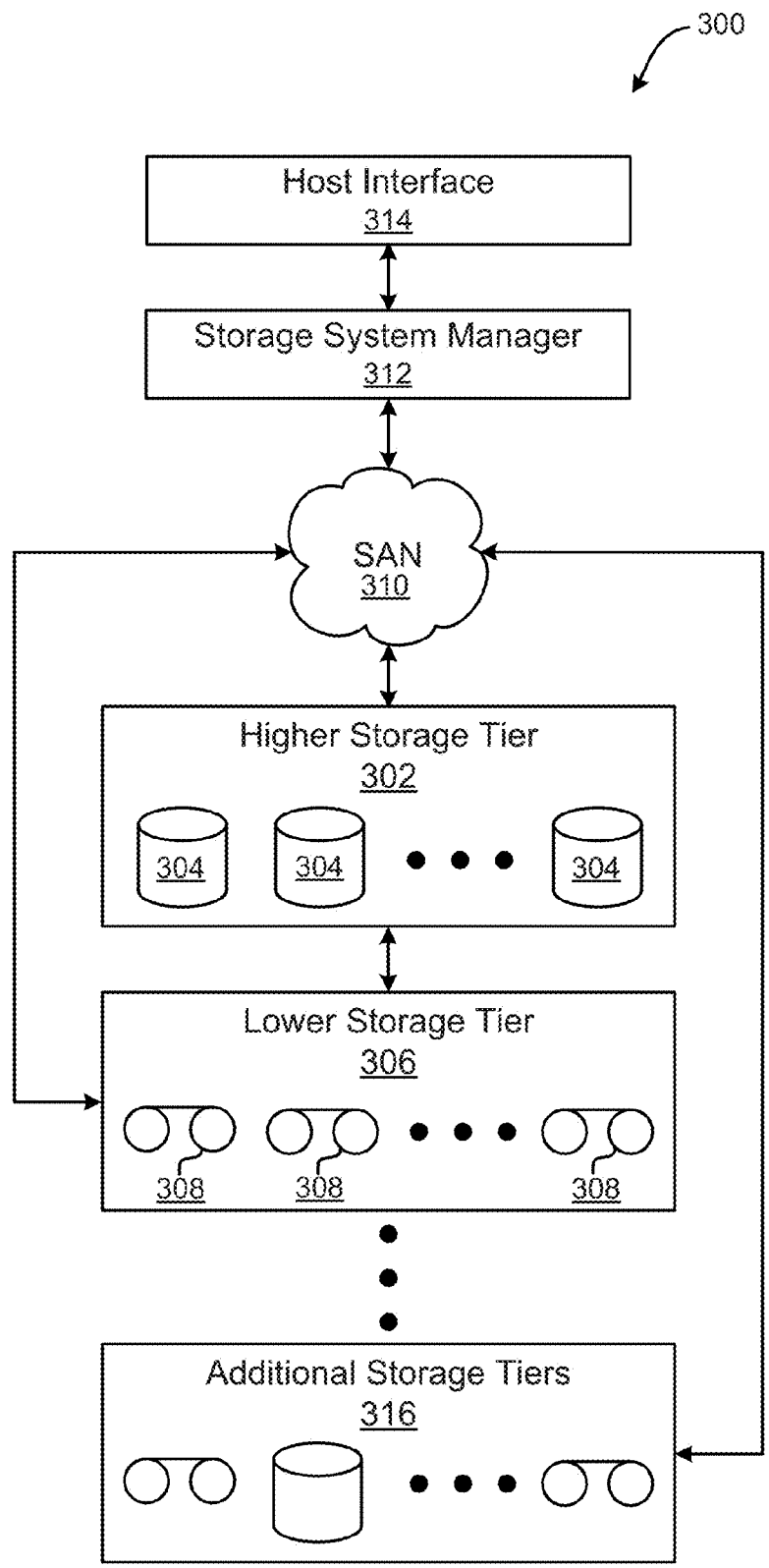
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. In some approaches, the storage system 300 may include a Redundant Array of Independent Disks (RAID) system, or other known hierarchical storage management system as would be understood by one having skill in the art upon reading the present disclosure.

As shown in FIG. 3, the storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312, The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data, storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, MID-ROM, etc.), or any combination of media storage types. In one such configuration, a higher storage tier 302, may include a majority of SSD storage media for storing data in a higher performing storage environment, and remaining storage tiers, including tower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
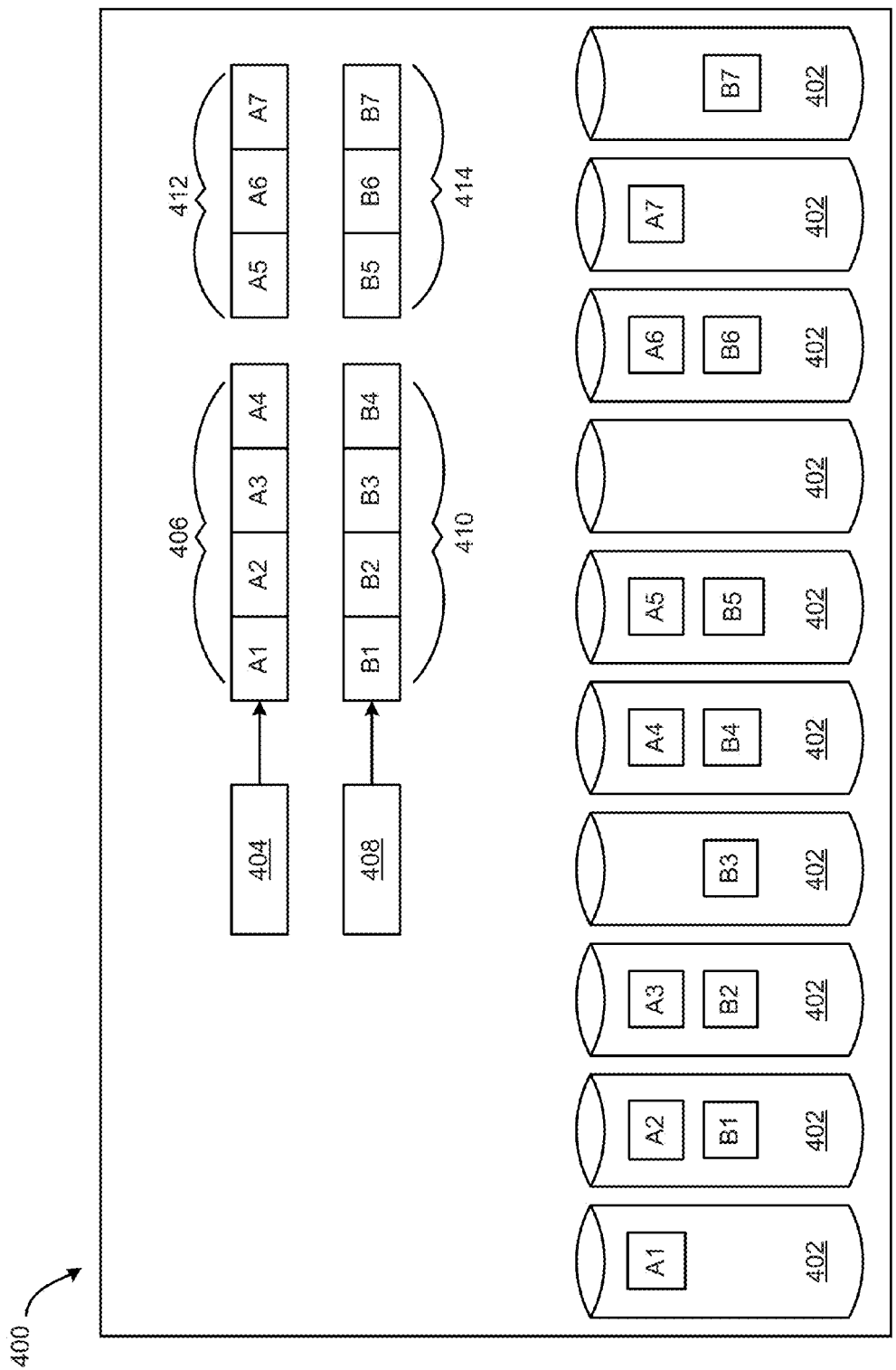
FIG. 4 illustrates a schematic of a storage pool according to one embodiment.

Referring now to FIG. 4, a schematic of a storage pool 400 is shown according to one embodiment. As shown in FIG. 4, the storage pool 400 includes a plurality of computer readable storage media 402. In some approaches, the plurality of computer readable storage media may comprise hard disk media. For simplicity, the computer readable storage media 402 shown in FIG. 4 is assumed to comprise hard disk media. It is important to note, however, that the computer readable storage media 402 is in no way limited to hard disk media, but may include other suitable storage media as would be understood by one having skill in the art upon reading the present disclosure.

In one embodiment, the storage pool 400 may include a processor (not shown) and logic ("storage pool logic") integrated with and/or executable by the processor, the logic being configured to perform various operations. For example, in one embodiment, this storage pool logic may be configured to divide application block A (AppBlockA) 404 into 4 data blocks (A1, A2, A3, A4) 406 spread across one or more disks in the storage pool 400. Similarly, the storage pool logic may be configured to divide application block B (AppBlockB) 408 into 4 data blocks (B1, B2, B3, B4) 410 across one or more disks in the storage pool 400.

The division of AppBlockA 404 and AppBlockB 408 may be based, in part, on the size of the application blocks and the size of each disk 402 in the storage pool 400, in some approaches. For example, the size of both application blocks (404 and 408) may be 4k, whereas the size of each disk 402 may be 1K. Accordingly, each application block (404 and 408) may be divided into 4 blocks spread over 4 distinct disks 402 in the storage pool 400.

In another embodiment, the storage pool logic may be configured to implement redundancy parity encoding (erasure code). Erasure code may allow any number of parity blocks for the data blocks of a given application block. The number of parity blocks may be determined/decided by an administrator, a user, operating conditions, an algorithm, etc.

For example, in various approaches an administrator may desire to have 3 parity blocks associated with an application block, such as the case illustrated in FIG. 4. As shown in FIG. 4, the data blocks of AppBlockA 404 are associated with 3 parity blocks (A5, A6, A7) 412; likewise, the data blocks of AppBlockB 408 are associated with 3 parity blocks (B5, B6, B7) 414. It is important to note that while 3 parity blocks are shown to be associated with the data blocks of each application block, this number of parity blocks is in no way limiting and is presented illustrative purposes only.

As also shown in FIG. 4, the data and parity blocks of AppBlockA 404, totaling 7, are stored on 7 different disks 402. Additionally, the data and parity blocks of AppBlockB 408, totaling 7, are stored on 7 different disks 402. As illustrated in FIG. 4, while each of the blocks from AppBlockA 404 are stored on distinct disks with respect to each other, some or all of these blocks may be stored on the same disk as a block associated with AppBlockB 408.

Per the erasure code logic, AppBlockA 404 and AppBlockB 408 may each sustain up to 3 disk failures, in other words, recovery of the original data associated with AppBlockA 404 and AppBlockB 408 may be obtained using at least 4 blocks associated with the respective application block.

In some approaches, a deduplication engine/layer (not shown in FIG. 4) may be located physically and/or functionally and/or logically within the storage pool 400. This deduplication engine/layer may be configured to implement deduplication processes at the disk block level, such as inline deduplication, post-processing deduplication, etc. For instance, with inline deduplication, as new data (e.g. an application block) is received from an application, the deduplication engine may split the received application block into a plurality of blocks. Each block may then be processed using a hash algorithm, including, but not limited to MD5, SHA-1, or other suitable hash algorithm as would be understood by one have skill in the art upon reading the present disclosure. The generated hashes may next be compared to hash values associated with existing blocks already stored in the storage pool, where such comparison may be made by referencing an in-memory mapping table in some approaches. If duplicate blocks are identified, e.g., a block whose generated hash value matches the hash value for an existing block stored in the storage pool, the deduplication engine/layer may store and/or communicate a reference/pointer to the existing block instead of communicating and/or storing the duplicate block in the storage pool. Non-duplicate blocks, e.g. blocks having no duplicate thereof, may be communicated and/or stored to the storage pool. As the deduplication may implement such a process with regard to each incoming/received application block, blocks stored in the storage pool may be shared (e.g. referenced by) one or more application blocks in various approaches. Additionally, with regard to post-processing deduplication techniques, duplicate blocks that are written and/or temporarily stored in the storage pool may be deleted (e.g. or marked as free), and replaced with a reference to the one remaining instance of the block.

It is important to note, however, that there may be disadvantages associated with conventional deduplication-erasure code environments, such as the environment described in FIG. 4. For example, the implementation of low level deduplication at the disk block level may result in destroying or reducing the reliability associated with erasure code semantics. For example, with regard to AppBlockA 404 shown in the FIG. 4, recovery of the original data associated with AppBlockA 404 requires at least 4 out of the 7 total blocks. As each of the 7 blocks (e.g., the 4 data blocks A1-A4, and the 3 data blocks A5-A7) are stored on 7 different disks, there is a guaranteed reliability of sustaining up to 3 disk failures. However, by way of example only, suppose instead that blocks A1 and A7 are placed on a first disk ("disk 1") due to a deduplication process, and the 5 remaining blocks (A2, A3, A4, A5, A6) are stored on 5 other disks ("disks 2-6", respectively); such that there are 6 total disks on which the blocks of AppBlockA 404 are stored. If disk 1, disk 2 and disk 3 were to fail (for a total of 3 disk failures), this would result in the loss of 4 blocks (A1, A2, A3, A7). As only 3 blocks remain (not the required at least 4 blocks for complete data recovery), the original data associated with AppBlockA 404 cannot be recovered. Thus, the guarantee of sustaining 3 disk failures will not be met in such a case.

Embodiments disclosed herein overcome the aforementioned drawbacks by providing a system, computer program product and method for dynamically tuning an amount of redundancy parity encoding (e.g. for dynamically tuning the reliability of one or more physical blocks using erasure codes) based on one or more deduplication indications of activity.

For example, in some approaches, block-access monitoring may be implemented to determine whether physical blocks in a deduplication-erasure code environment may be designated priority physical blocks. In various approaches, a physical block may be considered a priority physical block based on at least one of: a number of application blocks referencing the physical block, and a number of accesses the physical block. Priority physical blocks require more reliability. Accordingly, in preferred approaches, the reliability of (e.g. the number of parity blocks associated with) of a priority physical block may be increased, maintained or decreased based using erasure code, wherein the erasure code encoding rate for the priority physical block may be determined based on the degree/level of priority of the priority physical block in the deduplication-erasure environment. Moreover, as the degree/level of priority of designated priority blocks may change over time, e.g. periodically, based on access behaviors, the erasure code encoding rate may be tuned accordingly.

A unique advantage of such systems and/or methods, is the ability to increase the reliability of priority physical blocks in a storage pool without the space overhead required for replication and other recovery schemes.

Implementation of the dynamic tuning of the reliability of one or more physical blocks using erasure code based on deduplication indications of activity may be performed by any suitable component of the operating environment, e.g. a deduplication-erasure code environment. For example, in various non-limiting embodiments, dynamically tuning the reliability of priority physical blocks may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor. For instance, in some embodiments, such dynamic tuning may be performed by one or more processors embedded in, coupled to, and/or operating within a deduplication layer and/or a storage pool. In some preferred approaches, this deduplication layer may be separate from a storage pool, or a part of a storage pool.

Figure 5A:
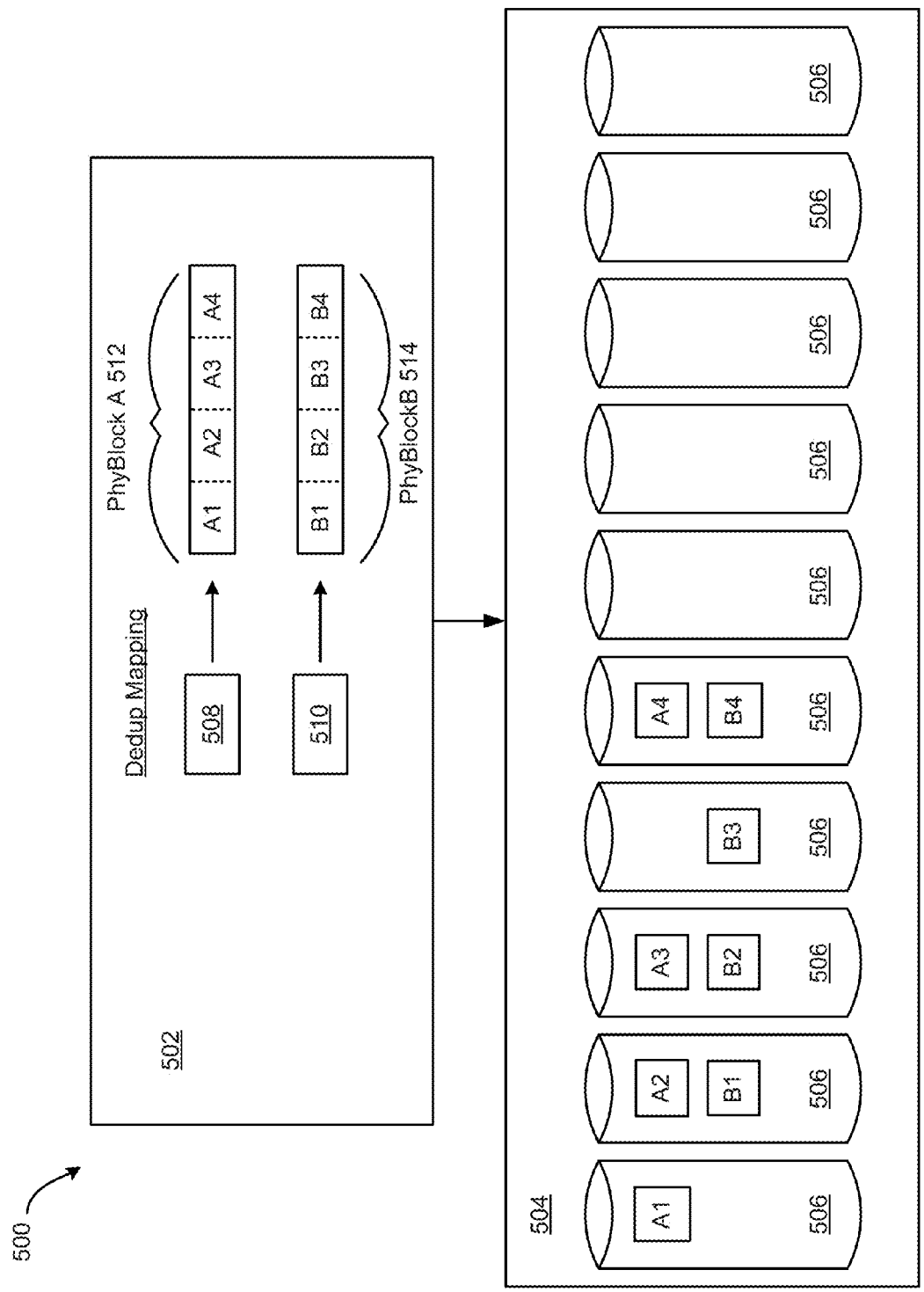
FIGS. 5A-5B illustrates schematics of a deduplication-erasure code environment 500 is according to various embodiments.
Figure 5B:
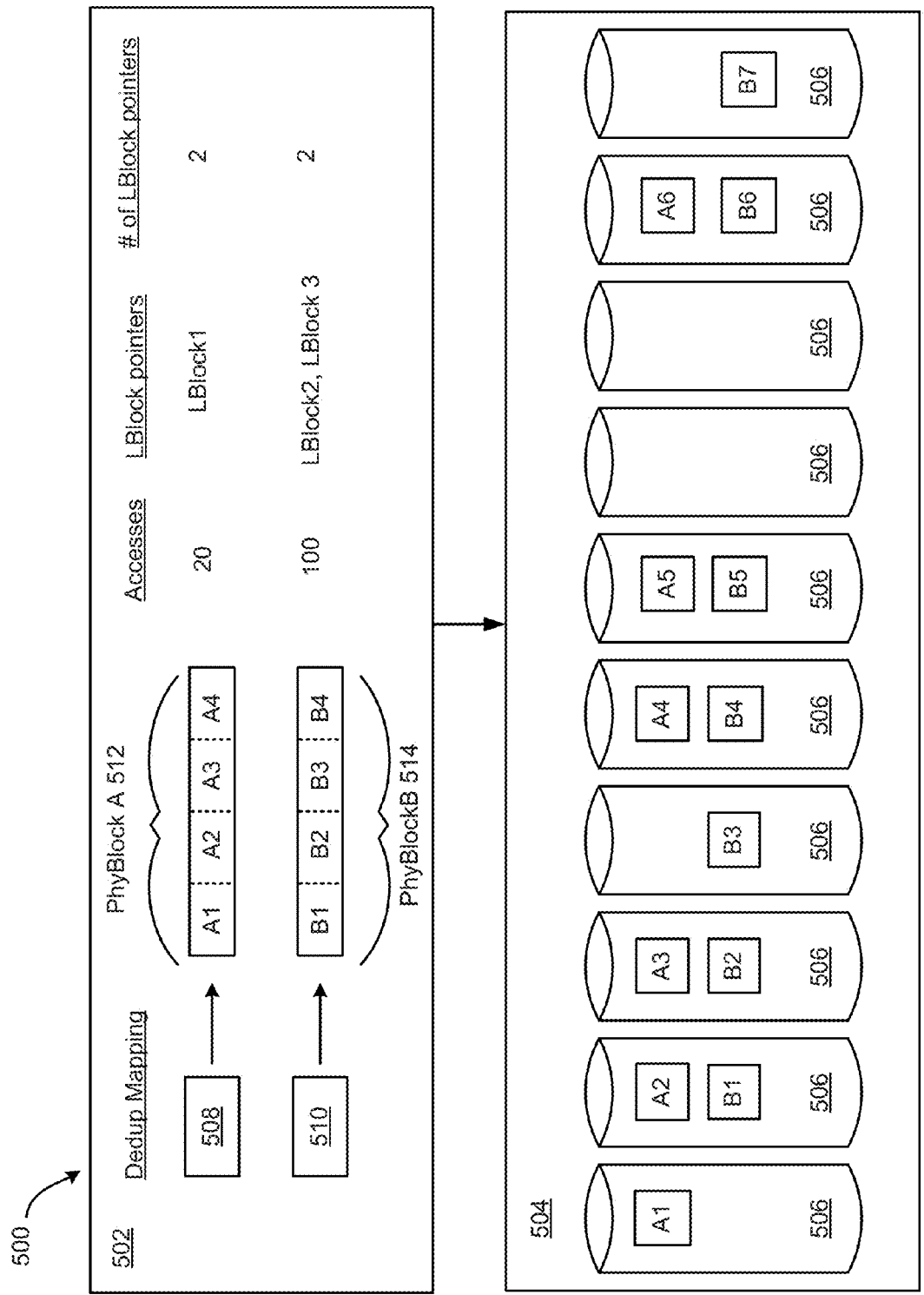

Now referring to FIGS. 5A-5B, a schematic of a deduplication-erasure code environment 500 is shown according to one embodiment. As an option, the deduplication-erasure code environment 500 may be implemented in conjunction with features from any other embodiment listed herein, such as those described with reference to the other FIGS. Of course, the deduplication-erasure code environment 500 and others presented herein may be used in various applications and/or in permutations which may or may not be specifically described in the illustrative embodiments listed herein.

As shown in FIG. 5A, the deduplication-erasure code environment 500 includes a deduplication layer/engine 502, and a storage pool 504. The storage pool 504 includes a plurality of computer readable storage media 506, e.g. hard disks. For simplicity, the computer readable storage media 506 shown in FIG. 5A comprises hard disk media. It is important to note, however, that the computer readable storage media 506 is in no way limited to hard disk media, but may include other suitable as would be understood by one having skill in the art upon reading the present disclosure.

As shown in FIG. 5A, the deduplication layer 502 is configured to implement a deduplication process, such as those described herein, wherein a received application block A (AppBlockA) 508 and a received application block B (AppBlockB) 510 may be mapped to a physical block A (PhyBlockA) 512 and a physical block B (PhyBlockB) 514, respectively.

The storage pool 504 virtualizes AppBlockA 508 and AppBlockB 510, each of which have 4 data blocks associated therewith, these blocks being internally stored in the storage pool 504, Specifically, PhyBlockA 512 (to which AppBlockA 508 is mapped) is internally divided into 4 data blocks (A1, A2, A3, A4) in the storage pool 504. Similarly, PhyBlockB 514 (to which AppBlockB 510 is mapped) is internally divided into 4 data blocks (B1, B2, B3, B4) in the storage pool 504. This division is not visible to the deduplication layer 502 and/or the application block referencing/pointing to the physical blocks, and/or the application.

In one embodiment, the storage pool 504 may include a processor (not shown) and logic ("storage pool logic") integrated with and/or executable by the processor, the logic being configured to perform various operations. For example, the storage pool logic may be configured to implement redundancy parity encoding, which may generate one or more parity blocks associated with data blocks of a given physical Hock. As shown in FIG. 5A, the data blocks of PhBlockA 512 are associated with 2 parity blocks (A5, A6), and the data blocks of AppBlockB 514 are associated also with 2 parity blocks (B5, B6).

As also shown in FIG. 5A, the data and parity blocks of PhyBlockA 512, totaling 6, are stored on 6 different disks 506. Additionally, the data and parity blocks of AppBlockB 514, totaling 6, are stored on 6 different disks 506. As illustrated in FIG. 5A, while each of the blocks from PhyBlockA 512 are stored on distinct disks with respect to each other, some or all of these blocks may be stored on the same disk as a block associated with PhyBlockB 514.

As further shown in FIG. 5A, the deduplication layer 502 is physically and/or functionally and/or logically separate from the storage pool 504 (e.g., the deduplication layer 502 may work above the storage pool 504). Accordingly, the deduplication layer 502 may act as an application with respect to the storage pool 504, and thus will see blocks A1-A4 as one big physical block (PhyBlockA 512). Similarly, the deduplication layer 502 will see blocks B1-B4 as one big physical block (PhyBlockB 514). Thus, the deduplication layer 502 may not have access to the individual disk blocks, but may have access at the block row level in some approaches. Moreover, is various approaches, low level deduplication at individual disks in the storage pool 504 may not be allowed and/or implemented, as such a process includes the possibility of having all data and parity block part of the same disk, thereby resulting in possible data loss with just a single or a few disk failures. Such a low level deduplication scheme may be undesirable as it would break the reliability guaranteed by redundancy parity encoding.

In one embodiment, the deduplication layer 502 may include a processor (not shown) and logic ("deduplication layer logic") integrated with and/or executable by the processor, the logic being configured to perform various operations. For example, in one embodiment, this deduplication layer logic may be configured to implement a "reliability management routine" involving the monitoring and/or storing of information associated with each physical block (e.g. PhyBlockA 512 and PhyBlockB 514) that has been received and whose constituent sub-units (data and/or parity blocks) are stored in the storage pool. In some approaches, this information may be stored in an in-memory mapping table.

In various approaches, this information may include the number of application block pointers (e.g. the application blocks referencing/pointing to each physical block). The information may also include the number of accesses to each physical block in more approaches. The number of accesses to each physical block may be the number of reads on each of the application blocks referencing/pointing to the physical block, in one approach. In even more approaches, this information may additionally include a weight calculated for each physical block. For example, the deduplication layer logic may be configured to calculate and/or assign a weight to each physical block, where such weight is based on the number of application blocks referencing/pointing to the physical block and/or the number of accesses to the physical block.

In further approaches, the information may include an identification of which physical blocks (if any) are designated as priority physical blocks. For example, the deduplication layer logic may designate a physical block a priority physical block when at least one of the following occurs: the number of application blocks referencing/pointing to the physical block exceeds a threshold (e.g., a "pointer threshold"), the number of access to the physical block exceeds another threshold (e.g. an "access threshold"), the calculated weight of the physical block exceeds yet another threshold (a "weight threshold"), or a combination thereof. Each of these thresholds may be predetermined, defined/set by a system, defined/set by a user, set based on historical operating conditions, derived from a table, etc.

In more approaches, the deduplication layer logic may designate a level of priority of a physical block (e.g. a physical block may be designated a priority physical block; a priority physical block may be designated a physical block; a priority physical block may continue to be designated a priority physical block, etc.) upon determining that a calculated weight of the physical block has changed over a time period, in some approaches, this time period may be periodic, may be specified by a user, may be arbitrary, may be based on historical operating conditions, etc. For instance, the deduplication layer logic may be configured to: calculate a first weight of the physical block at a first time; calculate a second weight of the physical block at a second time; and calculate a difference between the first and second weight. The deduplication logic may then designate the level of priority of the physical block when the difference between the first and second weight is equal to a nonzero value. In approaches where this difference is minimal (e.g. below a predetermined threshold) or zero, the designation of the level of the priority of the physical block may not change (e.g. the "priority status" of the physical block may be maintained). However, in approaches where this difference is not minimal or not trivial (e.g. the difference is above a predetermined threshold), the designation of the level of the priority (the "priority status") of the physical block may be changed (e.g. a physical block may be designated a priority physical block and vice versa). In more approaches, the deduplication layer logic may be configured to periodically monitor and/or calculate the weight of the physical block at various times (e.g. a third time, a fourth time, a fifth time, etc.) in order to determine whether the weight of the physical block has changed, and/or whether the level of priority of the physical block needs to be maintained or updated accordingly.

Consider the following non-limiting example, used for illustration purposes only. Suppose a physical block with a first weight calculated at a first time is not designated a priority physical block, but rather is simply a physical block. A second weight for the physical block may then calculated at a subsequent second time, and a difference between the first and second weight may yield: second weight−first weight>zero. This weight change, where the second weight is larger than the first weight, may reflect an increase in the number of application blocks referencing/pointing, to the physical block and/or an increase in the number of accesses to the physical block as calculated at the second time compared to the first time. Accordingly, in some approaches, where this difference (second weight−first weight) produces a value that is greater than zero and/or not trivial (e.g. above a predetermined threshold), the physical block may now be designated a priority physical block.

Continuing with the non-limiting example described above, suppose a third weight is calculated at a third time for the now-designated priority physical block, where the third time is subsequent to the second time. Also suppose that the difference between the second and third weights yields: second weight−third weight>0. This weight change, where the third weight is less than the second weight, may reflect a decrease in the number of application blocks referencing/pointing to the physical block and/or a decrease in the number of accesses to the physical blocks as calculated at the third time compared to the second time. Accordingly, in some approaches, where this difference (second weight−third weight) produces a value that is greater than zero and/or not trivial (e.g. above a predetermined threshold), the priority physical block may then lose its "priority status" and be designated a physical block.

In additional approaches, the deduplication layer logic may be further configured to pass the information described in the paragraphs above to the storage pool 504. In one embodiment, this information may be passed from the deduplication layer 502 to the storage pool 504 using an out of band traffic mechanism. In some embodiments where SCSI protocol may be used for block reads, reserved fields of SCSI command descriptor block (CDB) may be used to communicate this information to the storage pool 504.

Further, in still more approaches, the deduplication layer logic may be configured to periodically identity physical blocks for which there is a change in the number of accesses thereto, a change in the number of application block pointers, a change in the calculated weight for each block, etc. Consequently for physical blocks for which there is such a change, the deduplication layer logic may also send information comprising the changed values to the storage pool 504.

In numerous approaches, the storage pool 504 may be configured to determine a required erasure code encoding rate based on the received information (e.g. based on the calculated weight values of the physical blocks that are received and/or monitored by the deduplication layer). The required erasure code encoding rate determines the number of parity blocks required for each physical block. Accordingly, in certain approaches, per the new required erasure code encoding rate, existing parity blocks associated with the data blocks of a physical block may be removed, or new parity blocks associated with the data blocks of the physical block may be added. However, in approaches where the received information reflects no change in the number of accesses to a physical block, and/or no change in the number of application pointers to the physical block, and/or no change in the weight of the physical block, the number of parity blocks associated with the data blocks of the physical lock may be maintained.

By way of example only, FIG. 5B provides an illustration of the deduplication layer 502 implementing the aforementioned reliability management routine. As shown in FIG. 5B, the deduplication layer 502 observes and/or records that the number of accesses to PhyBlockA 512 and PhyBlockB 514 is 20 and 100, respectively, at a particular time. Moreover, the deduplication layer 502 also observes and/or records that the number of application block pointers to PhyBlockA 512 and PhyBlockB 514 is 1 and 2, respectively, at the particular time. Accordingly, based on the lower number of accesses and application block pointers associated with PhyBlockA 512, the degree of priority associated with PhyBlockA 512 may be considered less than the degree of priority associated with PhyBlockB 514.

With continued reference to FIG. 5B, the deduplication layer 502 may determine that the number of accesses and/or the number of application block pointers to PhyBlockB 514 exceeds a predetermined threshold, such that PhyBlockB 514 is designated a priority physical block. Accordingly, the deduplication layer 502 may send information associated with PhyBlockB 514 (e.g. the number of accesses, the number of application pointers, etc.) to the storage pool 504. The storage pool 504 may then be configured to calculate a required erasure code encoding rate based on the received information, and per the new required erasure code encoding rate, change the number of existing parity blocks associated with PhyBlockB 514. As shown in FIG. 5B, 2 additional parity blocks (B7, B8) may be newly associated with the data blocks of PhyBlockB 514 based on the required erasure encoding rate.

Figure 6:
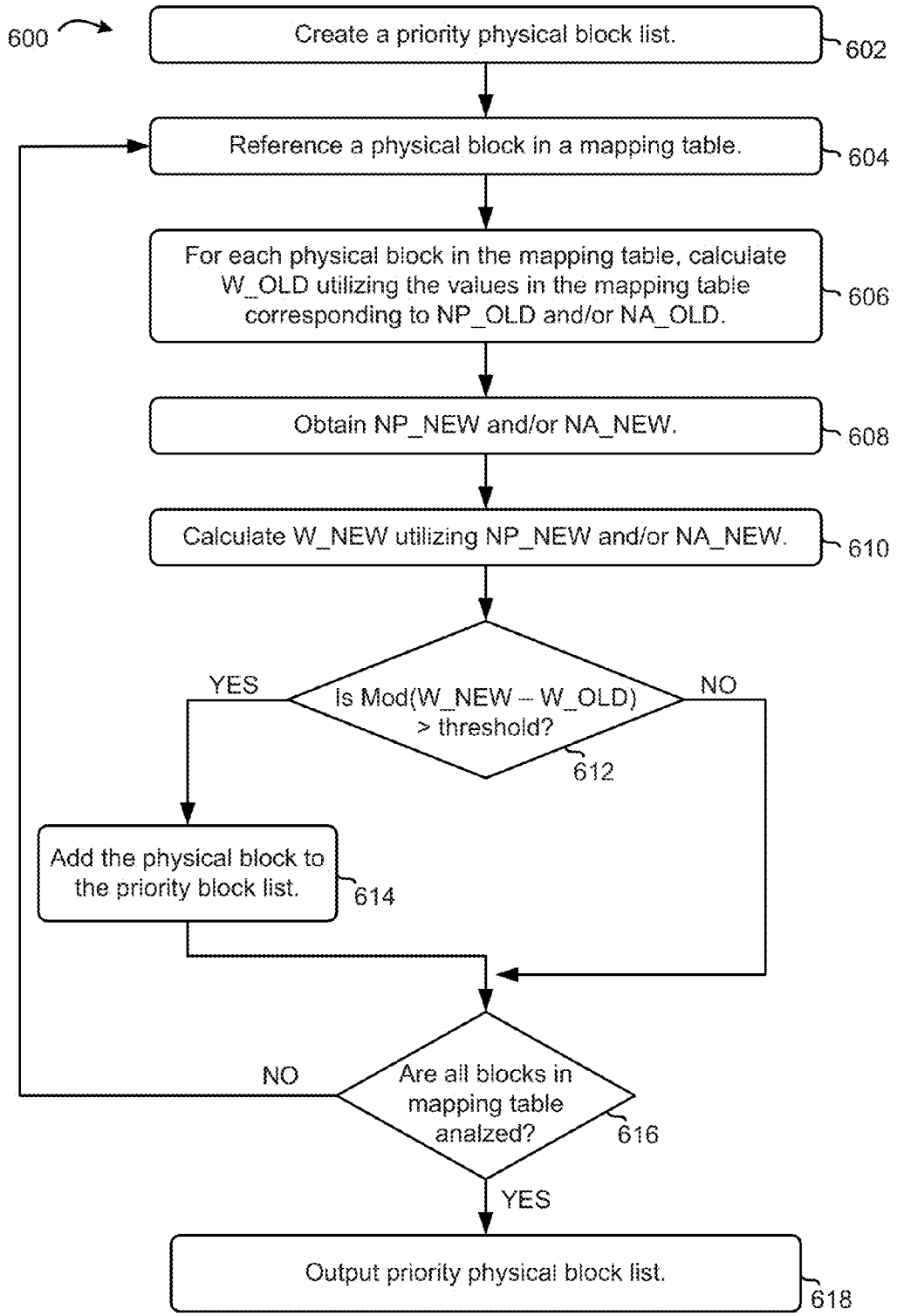
FIG. 6 illustrates a flowchart of a method for determining which physical blocks are priority physical blocks according to one embodiment.

Referring now to FIG. 6, a flowchart of a method 600 for determining which physical blocks are priority physical blocks is shown, according to one embodiment. As an option, the present method 600 may be performed in accordance with the present invention in any of the environments depicted in FIGS. 1-5, among others, in various embodiments. Of course, more or less operations than those shown in FIG. 6 may be included in method 600, as would be understood by one of skill in the art upon reading the present descriptions.

Each of the steps of the method 600 may be performed by any suitable component of the operating environment. For example, in various non-limiting embodiments, the method 600 may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor. In an exemplary embodiment, the method 600 may be performed by at least one processor embedded in and/or coupled to and/or operating within a deduplication layer. In some approaches, this deduplication layer is functionally and/or logically and/or physically separate from a storage pool comprising a plurality of computer readable storage media.

As shown in FIG. 6, the method 600 may initiate with operation 602, where a priority block list is created. In operation 604, a physical block in a deduplication mapping table may be referenced. In some approaches, the deduplication mapping table may include information associated with each physical block stored in a storage pool. For instance, in one approach the information may at least include a status of each physical block, the status indicating whether the physical block is allocated or free; a hash value for each physical block; a description of any application blocks referencing (e.g. pointing to) each physical block; a number of application blocks referencing each physical block; and a number of accesses to each physical block. In one approach, the number of accesses to each physical block may equate to the sum of all read requests on each of the one or more application blocks referencing (pointing to) the physical block.

In various approaches the method may also include updating the information in the mapping table. For example, for any write request on an application block, a hash value for the write block may be generated. If the generated hash value matches any of the hash values of the physical blocks listed in the mapping table, the application block may be mapped to an allocated physical block with a matching hash value (e.g. a description of the application block referencing the allocated physical block with the matching hash value may be added to the mapping table). However, if the generated hash value does not match any of the hash values of the physical blocks listed in the mapping table, the application block may be assigned to a free physical block a physical block having a status of free) in the mapping table, and a write for this physical block may be performed. Further, for any read request on an application block, the mapping table may be referenced to obtain the associated physical block; the read operation may then be performed on the associated physical block and the read count entry (e.g. the number of accesses to the physical block entry) may be updated in the mapping table.

Figure 7:
FIG. 7 illustrates an exemplary mapping table according to one embodiment.

In some approaches, the information prior to the update may be retained in the mapping table along with the updated information. An exemplary mapping table 700 including updated information (e.g. labeled "new") and information prior to the update (e.g. labelled "old") is shown in FIG. 7, according to one approach.

In numerous approaches, the mapping table may be created by and/or maintained by and/or stored in the deduplication layer.

With continued reference to FIG. 6, in operation 606, an old weight (W_OLD) for each physical block in the mapping table is calculated utilizing the values in the mapping table corresponding to the old number of application blocks referencing (e.g. NP_OLD) each physical block and/or the old number of accesses (e.g. NP_OLD) to each physical block.

In some approaches, a weight ($W_y$) for each physical block may be calculated according to Equation 1 below:

$$W_y = A*NA_y + B*NP_y \quad (1)$$

where the subscript y denotes the time at which the weight of the physical block is calculated (e.g. a first time, a second time, a third time, a fourth time, etc.); A and B are predetermined values; NA is the number of accesses to the physical block at time y, and NP is the number of application blocks referencing the physical block at time y. In various approaches, the predetermined values A and B may be set by a user, specified by an algorithm, may be derived from a table, etc. in such approaches, the predetermined values A and B may be the same or different, may include fractional values provided the overall value for W is an integer, may include integer values, may be 0, 1, 2, etc. For example, in some approaches, the predetermined value A may be 0, such that the weight for the physical block may be calculated only with respect to NP (the number of accesses to the physical block). In other approaches, the predetermined value B may be 0, such that the weight for the physical block may be calculated only with respect to NA (the number of accesses to the physical block).

With continued reference to Equation 1, the subscript y may be an integer value greater than zero, e.g. 1, 2, 3, etc. in numerous approaches. For instance, $W_1$ and $W_2$, may correspond to the weight of a physical block calculated at a first time (y=1), and a second time (y=2) respectively. In some approaches a weight of a physical block calculated at a first time may be designated as an old weight (e.g. W_OLD), whereas a weight calculated at a later, second time may be designated as a new weight (e.g. W_NEW). In more approaches, the weight of a physical block may be monitored and/or calculated at various times, such that a first weight ($W_1$) of a physical block is calculated at a first time (y=1), a second weight ($W_2$) of a physical block is calculated at a second time (y=2), a third weight ($W_3$) of a physical block is calculated at a third time (y=3), etc., where the second time is subsequent to the first time, the third time is subsequent to the second time, etc. in such approaches where the weight of the physical block may be monitored and/or calculated at various times y, the time periods/intervals between each of these times v may be periodic, predetermined, set by a user, specified by an algorithm, set based upon historical operating conditions, etc.

Referring again to FIG. 6, the method 600 includes obtaining or calculating, for each physical block in the mapping table, a new number of application blocks referencing (e.g. NP_NEW) each physical block and/or a new number of accesses (e.g. NA_NEW) to each physical block. See operation 608. In various approaches, NP_NEW and/or NA_NEW for each physical block may be added to the mapping table.

In operation 610, a new weight (W_NEW) for each physical block in the mapping table is then calculated utilizing NP_NEW for the physical block and/or NA_NEW for the physical block. W_NEW for each physical block may be calculated according to Equation 1, in some approaches.

In more approaches, W_OLD and/or W_NEW may be stored in the mapping table.

In operation 612, it is determined whether mod(W_NEW-W_OLD)>a threshold for each physical block in the mapping table. If so, method 600 continues to operation 614; otherwise method 600 continues to operation 616.

In operation 614, each physical block in the mapping table that has mod(W_NEW-W_OLD)>the threshold is added to the priority physical block list.

In operation 616, it is determined whether all the physical blocks in the mapping table have been analyzed, i.e. subject to operations 604 to 614 where relevant. If so, method 600 proceeds to operation 618; otherwise method 600 proceeds back to operation 604.

In operation 618, the priority physical block list, if not empty, is output. In some approaches, the priority physical block list may be output to a storage pool using out-of-band protocol.

Figure 8:
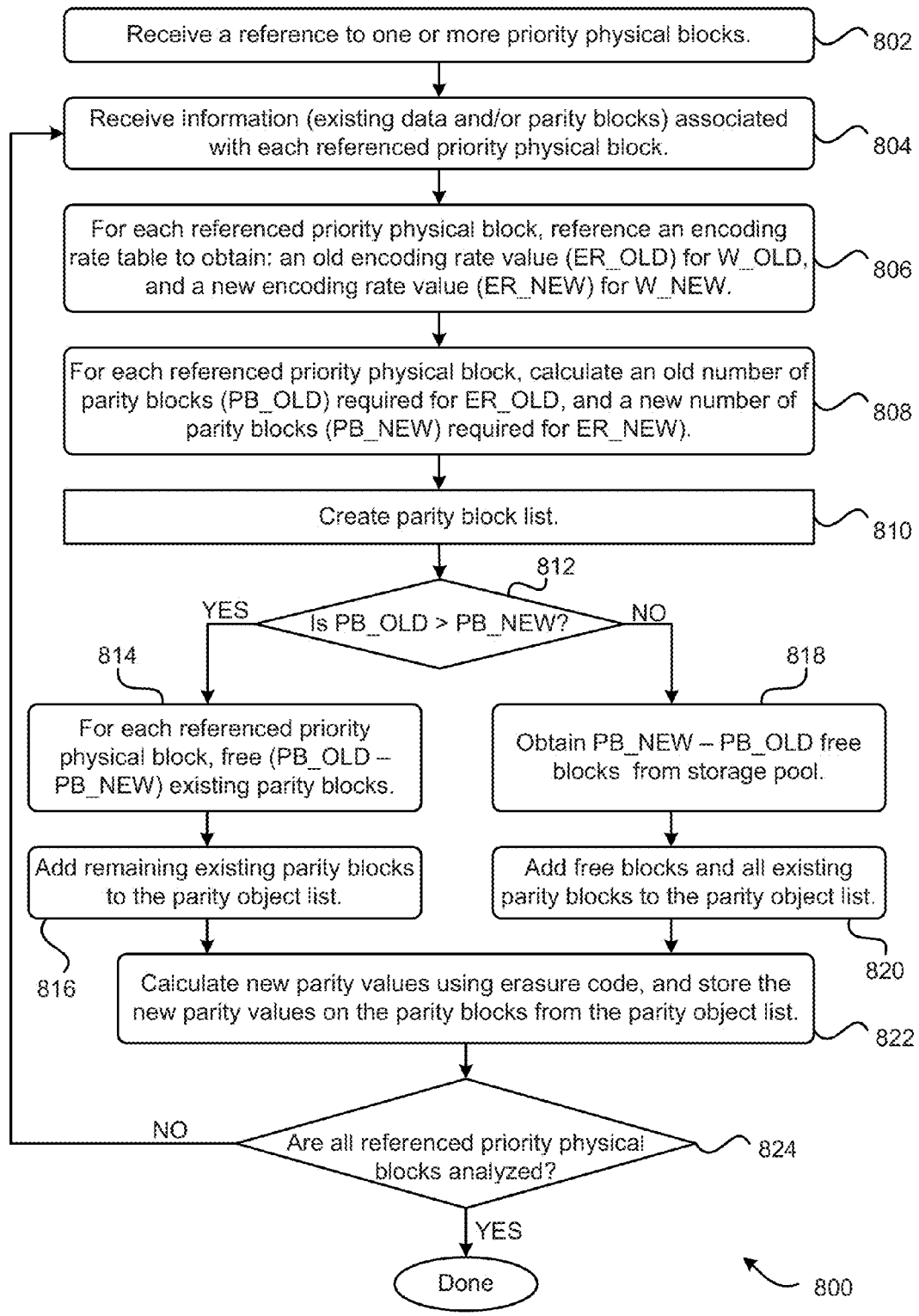
FIG. 8 illustrates a flowchart of a method for adjusting an amount of redundancy parity encoding according to one embodiment.

Referring now to FIG. 8, a flowchart of a method 800 for adjusting an amount of redundancy parity encoding is shown, according to one embodiment. As an option, the present method 800 may be performed in accordance with the present invention in any of the environments depicted in FIGS. 1-5, among others, in various embodiments. Of course, more or less operations than those shown in FIG. 8 may be included in method 800, as would be understood by one of skill in the art upon reading the present descriptions.

Each of the steps of the method 800 may be performed by any suitable component of the operating environment. For example, in various non-limiting embodiments, the method 800 may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor. In an exemplary embodiment, the method 800 may be performed by at least one processor embedded in and/or operating within a storage pool comprising a plurality of computer readable storage media. In some approaches, the plurality of computer readable storage media includes hard disk media.

As shown in FIG. 8, the method 800 may initiate with operation 802, where a reference to one or more priority physical blocks in a storage pool is received. In some approaches, this reference may be received from a deduplication layer by the storage pool, where the deduplication layer is separate from (e.g. above) the storage pool. In additional approaches, this reference may be the priority physical block list as described in FIG. 6.

With continued reference to FIG. 8, operation 804, information about each referenced priority block is received or generated, where the information includes a description of one or more existing data blocks and one or more parity blocks associated with each referenced priority physical block. As used herein, existing data blocks and existing parity blocks are those blocks already stored on one or more computer readable storage media in a storage pool. Additionally, in various approaches, this information may also include a description of the computer readable storage media associated with each of the one or more existing parity blocks and the one or more existing data blocks. For instance, in approaches where the computer readable storage media includes hard disk media, this received information may specify the particular disks upon which the existing parity and/or existing data blocks are stored.

In operation 806, for each referenced priority physical block, an encoding rate mapping table is referenced to obtain: an encoding rate value associated with an old weight (W_OLD), and another encoding rate value associated with a new weight (W_NEW). The encoding rate value associated with the old weight is herein referred to as the old encoding rate value (ER_OLD); whereas the another encoding rate value is herein referred to as the new encoding rate value (ER_NEW). The encoding rate mapping table may be created and/or maintained by a processor embedded in and/or coupled to a deduplication layer located separate from the storage pool, in various approaches. In additional approaches, the old weight and the new weight for each priority physical block are both calculated using Equation 1.

In operation 808, for each referenced priority physical block, a first number of parity blocks required for ER_OLD, and a second number of parity blocks required for ER_NEW is calculated. The first number of parity blocks required for the old encoding rate value may herein be referred to as an old number of parity blocks (PB_OLD); whereas the second number of parity blocks required for the new encoding rate value may herein be referred to as the new number of parity blocks (PB_NEW).

In exemplary approaches, for each referenced priority physical block, the number of parity blocks ($PB_y$) associated with an encoding rate value may be calculated according to Equation 2:

$$PB_y = (N_D/ER_y) - N_D, \quad (2)$$

where the subscript y corresponds to the time at which the number of parity blocks is calculated; $N_D$ is the number of one or more existing data blocks associated with the referenced priority physical block; and $ER_y$ is the encoding rate value corresponding to/associated with the weight of the referenced priority physical block at time y. For example, $ER_1$ may correspond to the encoding rate value corresponding to the weight of the physical block calculated at a first time, $ER_2$ may correspond to the encoding rate value corresponding to the weight of the physical block calculated at a second time, etc. Regarding ER_OLD and ER_New mentioned above, ER_OLD corresponds to the old weight of the physical block (e.g. the weight of the physical block calculated at a first time), and ER_NEW corresponds to the new weight of the physical block (e.g. the weight of the physical block calculated at a second time, where the second time is subsequent to the first time).

With continued reference to FIG. 8, a parity block list is created in operation 810. Subsequently, in operation 812, for each referenced priority physical block, it is determined whether PB_OLD is greater than PB_NEW. If so, then the method 800 proceeds to operation 814; otherwise the method 800 proceeds to operation 818.

In operation 814, for each referenced priority physical block having PB_OLD>PB_NEW, a number of existing parity blocks equal to the difference between the old number of parity blocks and the new number of parity blocks is freed, e.g. PB_OLD−PB_NEW existing parity blocks are freed. A description of the remaining existing parity blocks associated with each referenced priority physical block (e.g. those existing parity blocks which have not been freed) is then added to a parity block list in operation 816.

To illustrate operations 814 and 816 by way of example only, suppose that for a referenced priority physical block, the old number of parity blocks (PB_OLD) required for the old encoding rate value is 6, and the new number of parity blocks (PB_NEW) required for the new encoding rate value is 4. The difference between PB_OLD and PB_NEW is 2, e.g. 6−4=2; thus 2 existing parity blocks associated with the physical priority block are freed. A description of the 4 remaining existing parity blocks (6 old existing parity blocks−2 freed existing parity blocks=4) are then added to the parity block list.

In operation 818, for each referenced priority physical block having PB_OLD≤PB_NEW, a number of free blocks equal to PB_NEW−PB_OLD is obtained. In some approaches, the free blocks may be obtained from computer readable storage media (e.g. a hard disk medium) in the storage pool. In preferred approaches, the free blocks may be obtained from distinct computer readable storage medium, where the distinct computer readable storage media are not already associated with (e.g. does not have stored thereon) any of the one or more existing data blocks and/or the one or more existing parity blocks associated with the referenced priority physical block. A description of the obtained free blocks and all existing parity blocks associated with the referenced priority physical block may then be added to the parity block list in operation 820.

To illustrate operations 818 and 820 by way of example only, suppose that for a referenced priority physical block, the old number of parity blocks (PB_OLD) required for the old encoding rate value is 4, and the new number of parity blocks (PB_NEW) required for the new encoding rate value is 5. The difference between PB_NEW and PB_OLD is 1, e.g. 5−4=1: thus 1 free block from a computer readable storage medium in the storage pool is obtained. In preferred approaches, this computer readable storage upon which the 1 free block is stored is not already associated with any existing data and/or parity blocks associated with the referenced priority physical block. Accordingly, a description of the 1 free block, along with a description of the 4 existing parity blocks associated with the referenced priority physical block, are added to the priority block list.

In operation 822, new parity values for the existing data blocks associated with each referenced priority physical block are calculated using redundancy parity encoding (erasure code), The new parity values are then stored on the respective parity blocks that were added to the parity block list.

In operation 824, a determination is made as to whether each referenced priority physical block has been analyzed, i.e., subject to operations 804 to 822 where relevant. If so, method 800 terminates; otherwise method 800 proceeds back to operation 804.

Figure 9:
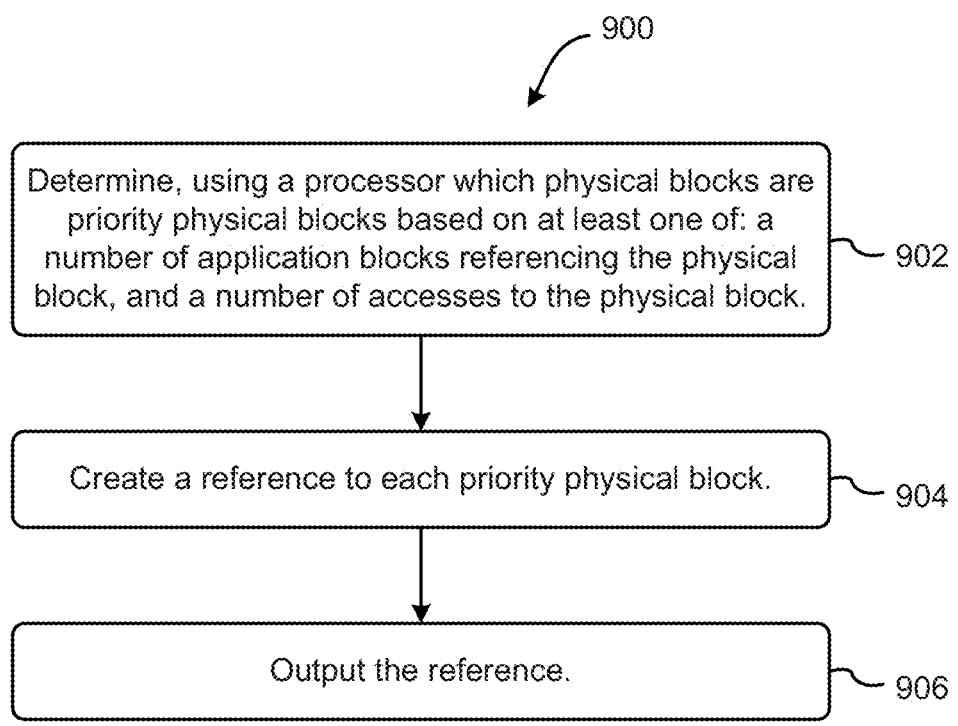
FIG. 9 for determining which physical blocks are priority physical blocks is shown according to one embodiment

Referring now to FIG. 9, a flowchart of a method 900 for determining which physical blocks are priority physical blocks is shown according to one embodiment. As an option, the present method 900 may be performed in accordance with the present invention in any of the environments depicted in FIGS. 1-5, among others, in various embodiments. Of course, more or less operations than those shown in FIG. 9 may be included in method 900, as would be understood by one of skill in the art upon reading the present descriptions.

Each of the steps of the method 900 may be performed by any suitable component of the operating environment. For example, in various non-limiting embodiments, the method 900 may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor. In an exemplary embodiment, the method 900 may be performed by at least one processor embedded in and/or coupled to and/or operating within a deduplication layer. In some approaches, this deduplication layer may be separate from a storage pool comprising a plurality of computer readable storage media.

As shown in FIG. 9, the method 900 includes determining, e.g. using a processor, which physical blocks are priority blocks based on one or more deduplication indications of activity, where exemplary deduplication indications of activity may be at least one of: a number of application blocks referencing each physical block, and a number of accesses to each physical block. See operation 902. The number of accesses to each physical block may correspond to the sum of all read requests on the one or more application blocks that reference each physical block in one approach.

In one embodiment, each physical block may be determined to be a priority physical block based on a calculated weight. In some approaches, this calculated weight may be based on at least one of the number of application blocks referencing the physical block and the number of accesses to the physical block. In more approaches, each physical block may be determined to be a priority physical block based on a change in the calculated weight over a predetermined time period.

In another embodiment, the step of determining which physical blocks are priority blocks may include calculating a first weight ($W_1$) for each of the physical blocks at a first time, and calculating a second weight ($W_2$) for each of the physical blocks at a second time, where $W_1$ and $W_2$ are calculated according to Equation 1. For instance, $W_1$ may be calculated according to: $W_1 = A*NA_1 + B*NP_1$, where A and B are predetermined values, $NA_1$ is the number of accesses to the physical block at the first time, and $NP_1$ is the number of application blocks referencing the physical block at the first time Additionally, $W_2$ may be calculated according to $W_2 = A*NA_2 + B*NP_2$, where $NA_2$ is the number of accesses to the physical block at the second time, and $NP_2$ is the number of application blocks referencing the physical block at the second time;

In some approaches, the calculated first weight and second weight for each physical block may be stored in a memory coupled to a processor, (e.g. a processor embedded in and/or operating within a deduplication layer), in a mapping table created, maintained and/or stored by a processor embedded in and/or operating within a deduplication layer, etc. Additionally, in various approaches, the method 900 may determine that a physical block is a priority physical block when a difference between the first calculated weight and the second calculated weight for that physical block equals a nonzero value.

In yet another embodiment, the step of determining which physical blocks are priority blocks may include determining whether a number of application blocks referencing a physical block exceeds a reference threshold and/or determining whether a number of accesses to the physical block exceeds an access threshold. In some approaches, the reference and access thresholds may be the same or different, may be predetermined, set by a user, based on historical conditions, derived from a table, specified by an algorithm, etc.

In a further embodiment, the method 900 may include creating a mapping table having information associated with each physical block stored in a storage pool. For instance, in one approach the information may at least include a status of each physical block, the status indicating whether the physical block is allocated or free; a hash value for each physical block; a description of any application blocks referencing each physical block; a number of application blocks referencing each physical block; and a number of accesses to each physical block. In various approaches the method may also include updating the information in the mapping table. In some approaches, the information prior to the update may be retained in the mapping table along with the updated information.

In preferred approaches, the information in the mapping table may include at least the following: a status of each physical block, the status indicating whether the physical block is allocated or free; a physical block hash value for each physical block; a description of any application blocks referencing each physical block at a first time; a number of application blocks referencing each physical block at the first time; a number of accesses to each physical block at the first time; a description of any application blocks referencing each physical block at a second time; a number of application blocks referencing each physical block at the second time; and a number of accesses to each physical block at the second time. The time interval between the first time and the second time may be periodic, set by a user, based on historical operating conditions and/or based on an algorithm, etc. For instance, occurrence of one or more events may trigger obtaining, at the second time, a description of any application blocks referencing each physical block; a number of application blocks referencing each physical block; and a number of accesses to each physical block, and updating the mapping table accordingly. In more approaches, the mapping table may also include a weight for each physical block at a first time and a second time, where the weights may be calculated according to Equation 1.

With continued reference to FIG. 9, the method 900 also includes creating a reference to each determined priority physical block, and outputting this reference in operations 904 and 906, respectively. In some approaches, the reference may be output, e.g. from a deduplication layer/engine, to a storage pool, where the storage pool is physically and/or functionally separate from the deduplication layer/engine.

Figure 10:
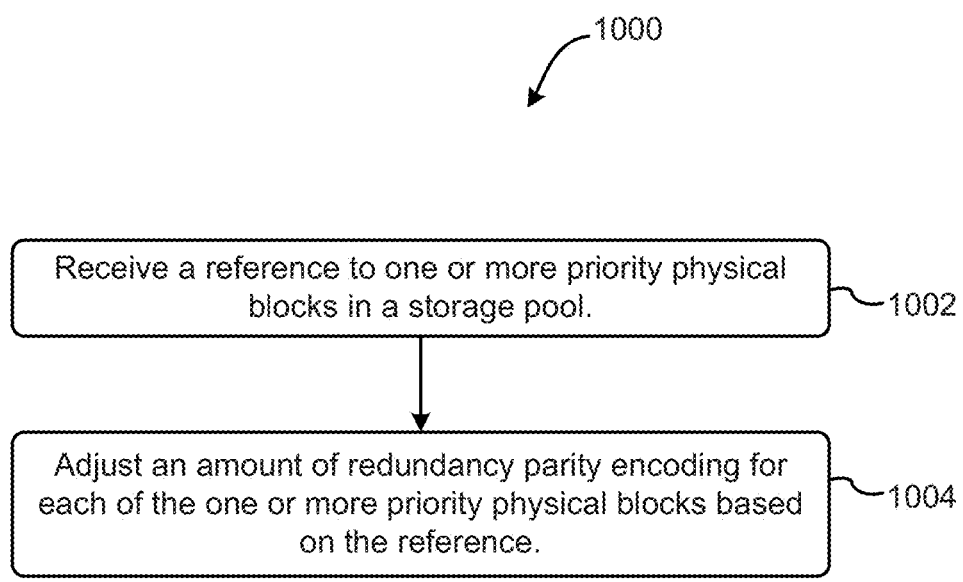
FIG. 10 illustrates a flowchart of a method for adjusting an amount of redundancy parity encoding according to one embodiment.

Next referring to FIG. 10, a flowchart of a method 1000 for adjusting an amount of redundancy parity encoding is shown, according to one embodiment. As an option, the present method 1000 may be performed in accordance with the present invention in any of the environments depicted in FIGS. 1-5, among others, in various embodiments. Of course, more or less operations than those shown in FIG. 10 may be included in method 1000, as would be understood by one of skill in the art upon reading the present descriptions.

Each of the steps of the method 1000 may be performed by any suitable component of the operating environment. For example, in various non-limiting embodiments, the method 1000 may be partially or entirely performed by a processor, such as a central processing unit (CPU), an application specific integrated circuit (ASIC), a field programmable gate array (FPGA), etc., which may be e bedded in and/or operate within a system, an apparatus, a drive, a storage device, etc., and which may have logic embedded with and/or accessible to the processor. In an exemplary embodiment, the method 1000 may be performed by at least one processor embedded in and/or operating within a storage pool comprising a plurality of computer readable storage media. In some approaches, the plurality of computer readable storage media includes hard disk media.

As show in FIG. 10, a reference to one or more priority physical blocks in a storage pool is received in operation 1002. In some approaches, the one or more priority physical blocks may be a subset of total number physical blocks present in the storage pool. In other words, a number of the one or more priority blocks may be less than the total number of physical blocks in the storage pool.

In one embodiment, the one or more priority physical blocks may be physical blocks having at least one of: a number of application blocks referencing the physical block exceeding a first threshold, a number of accesses to the physical block exceeding a second threshold, and a weight that is based on at least one of the number of application blocks referencing the physical block and the number of accesses to the physical block.

In another embodiment, the method 1000 may also receive information about each priority physical block in the reference and/or separately therefrom, where the information includes: one or more existing parity blocks and one or more existing data blocks associated with each priority physical block. This received information may also include a description of the computer readable storage media associated with each of the one or more existing parity blocks and the one or more existing data blocks. For instance, in approaches where the computer readable storage media includes hard disk media, this received information may specify the particular disks upon which the parity and data blocks are stored.

With continued reference to FIG. 10, an amount of redundancy parity encoding (erasure code) fir each of the one or more referenced priority physical blocks is adjusted based on the reference. See operation 1004.

In one embodiment, adjusting the amount of redundancy parity encoding for each referenced priority physical block includes receiving a first encoding rate value corresponding to a first weight for each priority physical block at a first time, and a second encoding rate value corresponding to a second weight for each priority physical block at a second time, Each of the weights (e.g. the first and second weights) may be calculated according to Equation 1, in some approaches. Moreover, the first encoding rate and the second encoding rate values for each priority physical block may be received as a result of referencing an encoding rate mapping table, additional approaches. This encoding rate mapping table may be created and/or maintained by a processor embedded in and/or coupled to a deduplication layer located separate from the storage pool, in various approaches.

For each referenced priority physical block, a first number of parity blocks associated with the first encoding rate value, and a second number of parity blocks associated with the second encoding rate value may be calculated. In exemplary approaches, for each priority physical block, the number of parity blocks associated with an encoding rate value may be calculated according to Equation 2, discussed above. For example, the first number of parity blocks ($PB_1$) for each referenced priority physical block may be calculated according to $PB_1$ ($N_D/ER_1$)–$N_D$, where $N_D$ is the number of the one or more existing data blocks associated with the physical block, and $ER_1$ is the first encoding rate value corresponding to a first weight for the physical block at a first time. Additionally, the second number of parity blocks ($PB_2$) for each referenced priority physical block may be calculated according to: $PB_2=(N_D/ER_2)–N_D$, here $ER_2$ is the second encoding rate value corresponding to a second weight for each physical block at a second time.

A determination may next be made for each referenced priority physical block as to whether the calculated first number of parity blocks is greater than, less than, or equal to the calculated second number of parity blocks. For instances where the calculated first number of parity Hocks is greater than the calculated second number of parity blocks, a number of existing parity blocks associated with referenced priority physical lock may be freed in some approaches, where this number is equal to the difference between the first number of parity blocks and the second number of parity blocks, A description of the existing parity blocks which have not been freed (e.g. the remaining existing parity blocks) may then be added to a parity block list.

For instances where the calculated first number of parity blocks is less than or equal to the calculated second number of parity blocks, a number of free blocks equal to a difference between the second number of parity blocks and the first number of parity blocks may be Obtained. In some approaches, the free blocks may be obtained from at least one computer readable storage medium (e.g. a hard disk medium) in the storage pool. In preferred approaches, the free blocks may be obtained from at least one distinct computer readable storage medium in the storage pool, where the distinct computer readable storage medium is not associated with (e.g. does not have stored upon) any of the one or more existing data blocks and/or the one or more existing parity blocks associated with the priority physical block. A description of the obtained free blocks and the existing parity blocks associated with the priority physical block may then be added to the parity block list.

Subsequently, new parity values corresponding to the redundancy parity encoding may be calculated for each of the one or more priority physical blocks. The parity values for each of the priority physical blocks may then be stored on their associated parity blocks (e.g. those described in the parity block list).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified application function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of be present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    determining, using a processor, which physical blocks are priority physical blocks, wherein a physical block is determined to be a priority physical block based on at least one of: a number of application blocks referencing the physical block, and a number of accesses to the physical block;
    creating a reference to each priority physical block; and
    outputting the reference,
    wherein a physical block is determined to be a priority physical block based on a weight that is based on at least one of the number of application blocks referencing the physical block and the number of accesses to the physical block, wherein the determining includes:
    calculating a first weight for each of the physical blocks at a first time, the first weight ($W_1$) being calculated according to $W_1 = A*NA_1 + B*NP_1$, wherein A and B are predetermined values, $NA_1$ is the number of accesses to the physical block at the first time, and $NP_1$ is the number of application blocks referencing the physical block at the first time; and
    storing the first weight for each physical block.

2. The method as recited in claim 1, wherein the determining further includes:
    calculating a second weight for each physical block at a second time, the second weight ($W_2$) being calculated according to $W_2 = A*NA_2 + B*NP_2$, where $NA_2$ is the number of accesses to the physical block at the second time, and $NP_2$ is the number of application blocks referencing the physical block at the second time;
    storing the second weight for each physical block; and
    wherein a physical block is determined to be a priority physical block when a difference between the first weight and the second weight is a nonzero value.

3. The method as recited in claim 1, wherein a physical block is determined to be a priority physical block when at least one of: a number of application blocks referencing the physical block exceeds a reference threshold, and a number of accesses to the physical block exceeds an access threshold.

4. The method as recited in claim 1, further comprising creating a mapping table comprising information associated with each physical block stored in a storage pool, the information comprising:
    a status of each physical block, the status indicating whether the physical block is allocated or free;
    a physical block hash value for each physical block;
    a description of any application blocks referencing each physical block at a first time;
    a number of application blocks referencing each physical block at the first time:
    a number of accesses to each physical block at the first time;
    a description of any application blocks referencing each physical block at a second time a number of application blocks referencing each physical block prior at the second time; and
    a number of accesses to each physical block at the second time.

5. The method as recited in claim 4, further comprising:
    generating a hash value for each data block and/or each parity block referenced by the application block;
    comparing each generated hash value to the mapping table to determine one or more matches;
    assigning the application block to a free physical block in the mapping table in response to determining no match; and
    assigning the application block to an allocated physical block comprising a matching hash value in response to determining the match.

6. A method, comprising:
    receiving a reference to one or more physical blocks in a storage pool that are determined to be priority physical blocks, wherein a physical block is determined to be a priority physical block based, at least in part, on a weight calculated according to $W_y, A*NA_y + B*NP_y$, wherein y corresponds to a time at which the weight is calculated, A and B are predetermined values, NA is the number of accesses to the physical block at time y, and NP is the number of application blocks referencing the physical block at time y; and
    adjusting an amount of redundancy parity encoding for each of the one or more priority physical blocks based on the reference.

7. The method as recited in claim 6, wherein the one or more priority physical blocks are physical blocks having at least one of: a number of application blocks referencing the physical block exceeding a reference threshold and a number of accesses to the physical block exceeding an access threshold.

8. The method as recited in claim 6, further comprising receiving information about each priority physical block, the information comprising: one or more existing parity blocks and one or more existing data blocks associated with each priority physical block.

9. The method as recited in claim 8, wherein adjusting the amount of redundancy parity encoding based on the reference comprises:
  receiving a first encoding rate value corresponding to a first weight for each priority physical block at a first time, and a second encoding rate value corresponding to a second weight for each priority physical block at a second time;
  calculating a first number of parity blocks associated with the first encoding rate value and a second number of parity blocks associated with the second encoding rate value;
  determining whether the first number of parity blocks is greater than, less than, or equal to the second number of parity blocks;
  freeing a number of the existing parity blocks equal to a difference between the first number of parity blocks and the second number of parity blocks in response to determining the first number of parity blocks is greater than the second number of parity blocks; and
  obtaining a number of free blocks equal to a difference between the second number of parity blocks and the first number of parity blocks in response to determining the first number of parity blocks is less than or equal to the second number of parity blocks.

10. The method as recited in claim 9, wherein the first number of parity blocks ($PB_1$) associated with the first encoding rate value is calculated according to: $PB_1 = (N_D/ER_1) - N_D$, where $N_D$ is the number of the one or more existing data blocks associated with the physical block, and $ER_1$ is the first encoding rate value corresponding to the first weight for each physical block at the first time; wherein the second number of parity blocks ($PB_2$) associated with the first encoding rate value is calculated according to: $PB_2 = (N_D/ER_2) - N_D$, where $ER_2$ is the second encoding rate value corresponding to the second weight for each physical block at the second time.

11. The method as recited in claim 9, wherein the free blocks are obtained from at least one distinct computer readable storage medium in a storage pool, wherein the at least one distinct computer readable storage medium is not associated with the one or more existing data blocks and/or the one or more existing parity blocks associated with the priority physical block.

12. The method as recited in claim 11, wherein the at least one distinct computer readable storage medium is a hard disk.

13. The method as recited in claim 9, further comprising:
  adding the existing parity blocks that have not been freed to a parity block list upon determining the first number of parity blocks is greater than the second number of parity blocks;
  adding the existing parity blocks and the free blocks to the parity block list upon determining the first number of parity blocks is less than or equal to the second number of parity blocks; and
  calculating new parity values using the redundancy parity encoding for each of the one or more priority physical blocks; and
  storing the new parity values on the associated blocks in the parity block list.

14. A system comprising:
  one or more computer readable storage media;
  at least one processor and logic integrated with and/or executable by the at least one processor, the logic configured to:
    receive a reference to one or more physical blocks in a storage pool that are determined to be priority physical blocks, wherein a physical block is determined to be a priority physical block based, at least in part, on a weight calculated according to $W_y = A*NA_y + B*NP_y$, wherein y corresponds to a time at which the weight is calculated, A and B are predetermined values, NA is the number of accesses to the physical block at time y, and NP is the number of application blocks referencing the physical block at time y; and
    adjust an amount of redundancy parity encoding for each of the one or more priority physical blocks based on the reference.

15. The system as recited in claim 14, wherein the logic is further configured to receive information about each priority physical block, the information comprising: one or more existing parity blocks and one or more existing data blocks associated with each priority physical block.

16. The system as recited in claim 15, wherein the logic is further configured to:
  receive a first encoding rate value corresponding to a first weight for each priority physical block at a first time, and a second encoding rate value corresponding to a second weight for each priority physical block at a second time;
  calculate a first number of parity blocks associated with the first encoding rate value and a second number of parity blocks associated with the second encoding rate value;
  determine whether the first number of parity blocks is greater than, less than, or equal to the second number of parity blocks;
  free a number of the existing parity blocks equal to a difference between the first number of parity blocks and the second number of parity blocks in response to determining the first number of parity blocks is greater than the second number of parity blocks; and
  obtain a number of free blocks equal to a difference between the second number of parity blocks and the first number of parity blocks in response to determining the first number of parity blocks is less than or equal to the second number of parity blocks.

17. The system as recited in claim 16, wherein the first number of parity blocks ($PB_1$) associated with the first encoding rate value is calculated according to: $PB_1 = (N_D/ER_1) - N_D$, where $N_D$ is the number of the one or more existing data blocks associated with the physical block, and $ER_1$ is the first encoding rate value corresponding to the first weight for each physical block at the first time; wherein the second number of parity blocks ($PB_2$) associated with the first encoding rate value is calculated according to: $PB_2 = (ND/ER_2) - N_D$, where $ER_2$ is the second encoding rate value corresponding to the second weight for each physical block at the second time.

18. The system as recited in claim 16, wherein the logic is further configured to:
  add the existing parity blocks that have not been freed to a parity block list upon determining the first number of parity blocks is greater than the second number of parity blocks;
  add the existing parity blocks and the free blocks to the parity block list upon determining the first number of parity blocks is less than or equal to the second number of parity blocks; and
  calculate new parity values using the redundancy parity encoding for each of the one or more priority physical blocks; and
  store the new parity values on the associated blocks in the parity block list.

* * * * *